(12) United States Patent
Nienaber et al.

(10) Patent No.: US 6,352,770 B1
(45) Date of Patent: Mar. 5, 2002

(54) CORRECTION TAPE HAVING DYE MIGRATION BLOCKING PROPERTIES

(75) Inventors: Renate Nienaber, Mainz (DE); Creg G. Bradley, Simpsonville; Shyamy R. Sastry, Greenville, both of SC (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 09/482,687

(22) Filed: Jan. 14, 2000

Related U.S. Application Data

(60) Provisional application No. 60/116,231, filed on Jan. 15, 1999.

(51) Int. Cl.⁷ .................................................. C09J 7/02
(52) U.S. Cl. ........................ 428/354; 428/343; 400/697
(58) Field of Search ................................ 428/354, 343; 400/697, 237, 240.1

(56) References Cited

U.S. PATENT DOCUMENTS

| | | | |
|---|---|---|---|
| 4,055,704 A | * 10/1977 | Fahimian et al. ............ 428/411 |
| 4,883,879 A | 11/1989 | Fukuda et al. ............ 400/697.1 |
| 5,221,577 A | 6/1993 | Inaba et al. .................. 428/354 |
| 5,556,469 A | 9/1996 | Koyama et al. ............. 118/257 |
| 5,700,552 A | 12/1997 | Katsuro et al. .............. 428/214 |
| 5,877,234 A | * 3/1999 | Xu et al. ..................... 523/161 |
| 5,925,693 A | * 7/1999 | Sanborn ...................... 523/161 |
| 6,025,413 A | * 2/2000 | Xu et al. ..................... 523/161 |

FOREIGN PATENT DOCUMENTS

| | | |
|---|---|---|
| EP | 647 689 | 4/1995 |
| WO | WO 92/07039 | 4/1992 |
| WO | WO 94/29393 | 12/1994 |
| WO | WO 96/01878 | 1/1996 |
| WO | WO 98/30641 | 7/1998 |

* cited by examiner

*Primary Examiner*—Daniel Zirker
(74) *Attorney, Agent, or Firm*—Pennie & Edmonds LLP

(57) ABSTRACT

The present invention is directed to a correction tape that has a support member, a transfer layer, and a correction medium layer. The correction medium layer includes an opacifying pigment, binding polymer, and bleed inhibitor. Suitable bleed inhibitors include polyvinyl amine, phospholipids, tallow amines or combinations thereof. The bleed inhibitor is present in an amount of between about 0.1% to 10% by weight.

18 Claims, No Drawings

CORRECTION TAPE HAVING DYE MIGRATION BLOCKING PROPERTIES

This application claims benefit of Prov. No. 60/116,231 filed Jan. 15, 1999.

BACKGROUND OF THE INVENTION

The present invention is directed to correction tapes having dye migration blocking properties. More specifically, the present invention includes a correction medium layer comprising an opacifying pigment, binding agent, and bleed inhibitor and a transfer layer on a support member to form a correction tape that can be used to mask erroneous markings with improved resistance to ink bleed through.

Correction tape is a commonly used method to correct erroneous markings. The tape typically comprises two parts, a polymeric tape as a base, and a corrective composition that may be multi-layered. The corrective composition may contain pigments, fillers, such as clay, a polymeric binder and dispersant to anchor the pigments to the paper, as well as, a dispersant medium or solvent to maintain fluid viscosity.

A layer of correction medium is deposited onto a tape which is later transferred onto paper once pressure is applied on the tape. The result is a layer of correction medium layer over the erroneous marking.

Correction tapes allow ink dyes to bleed through, or into, the applied correction material. Typically, latex binder polymer emulsions are acrylic copolymers and/or ethylene vinyl acetate copolymers, which minimize the diffusion of underlying ink markings into or through the correction layer which is applied over the ink marks. Such dissolution of the marking causes so-called bleeding or smudging of the marking into the correction fluid, which causes a discoloration of the film and corrected spot. Bleeding means that the white correction layer assumes a bluish or reddish tint or other type of blemish color due to the ink dye penetrating the surface being corrected. This bleeding effect is a major shortcoming of the presently used correction tapes.

European Patent No. 0 647 689 A1 discloses a correction fluid capable of preventing bleedthrough which uses an aminosilane in combination with an acid-functional vinyl polymer to create a correction fluid with effectively fixes the aqueous based ink dyes and prevent them from migrating into white type-out correction fluids.

German Patent No. WO 92/07039 discloses a correction fluid capable of preventing bleeding which contains water or a mixture of water and volatile organic water-miscible solvents as suspension medium, and a cationically active film-forming binder to fix the dyes in the area to be corrected.

PCT patent application WO 94/29393 discloses an aqueous correction fluid with a cationic polymer suitable for application to marks made with water-fast inks. The aqueous correction fluid includes water, an opacifying pigment dispersed in the water, a cationic polymer that inhibits bleeding, and a water insoluble film-forming polymer. The cationic polymer inhibits bleeding of the ink through the corrective coating by hindering the movement of anionic dyes from the ink mark through the corrective coating.

PCT patent application WO 96/01878 discloses a correction fluid with a cationic stain blocking agent which primarily serves as a binder, enabling the correction fluid to effectively bind pigments to paper and form a continuous dry film at room temperature. The correction fluid contains an opacifying agent, which includes a blend of titanium dioxide, and a clay which act in combination with the stain blocking agent to improve the hiding power of the correction fluid.

PCT patent application WO 98/30641 discloses a correction fluid which includes an opacifying agent, a cationic film-forming polymer, a nonionic film-forming agent, and a dispersing agent. The cationic film-forming polymer serves as a binder, enabling the correction fluid to effectively bind to a paper substrate and to form a continuous film on the paper substrate upon drying at room temperature. The opacifying agent comprises of two grades of titanium dioxide. A first grade of titanium dioxide selected to provide hiding power, and a second grade of titanium dioxide selected to provide suspension redispersability, a film-forming layer, and water. Thus, the combination of two types of titanium dioxide allow to maximize the masking ability of the liquid while minimizing the solubility of the masking agent.

Despite these efforts to formulate correction fluids which prevent bleed through, correction tapes having better bleed through resistance are still desired by the industry. As new water and solvent based ink compositions are developed, new compositions and formulations of correction tapes are necessary to maintain good bleed through resistance.

SUMMARY OF THE INVENTION

The present invention is directed to a correction tape comprising a support member, a correction medium layer, and a transfer layer. The support member is typically paper, a thermoplastic film, or metallic foil. The correction medium layer includes an opacifying pigment in an amount sufficient to mask printed or ink matter on a substrate; a bleed inhibitor in an amount sufficient to prevent or reduce ink transmission through the correction medium layer; and a binding polymer for retaining the opacifying pigment and bleed inhibitor in the correction medium layer to facilitate deposition of the layer on the support member and transfer of the layer onto printed or ink matter on a substrate.

Advantageously, the bleed inhibitor comprises at least one of a polyvinyl amine, a phospholipid, a tallow amine, or a mixture thereof. Preferably, the bleed inhibitor includes the combination of the polyvinyl amine and the phospholipid, optionally with the tallow amine, if desired. The bleed inhibitor is typically present in the correction medium layer in an amount between about 0.01% to about 10% by weight.

Generally, the opacifying pigment comprises $TiO_2$. The correction medium layer further comprises one or more of a biocide, filler, defoamer, wax emulsion, or surfactant. If desired, at least one toner or coloring agent can be included to impart a color to the correction medium layer.

The transfer layer facilitates the deposition of the correction medium layer onto a surface containing erroneous markings. The transfer layer comprises at least one pressure sensitive adhesive which is applied over the correction medium layer.

DETAILED DESCRIPTION OF THE INVENTION

The present invention resolves the problem of bleed-through of dyes through correction compositions by introducing a chemical additive in the correction medium layer which serves a dual function. The first function is to prevent dye migration, and the second function to prevent smearing of inks written over the correction medium layer.

The present invention provides several benefits. one embodiment of the invention provides a two layered correction tape that increases bleed through resistance. Another advantage of the two-layered tape is that the present invention can be used on conventional machinery, thus not requiring additional equipment for the manufacture of the two-layered tape. Yet another advantage of the present invention is that the bleed inhibitor provides improved ink bleed resistance in the correction tape. Additionally the write-over ability of the correction tapes is improved over the conventional prior art tapes without sacrificing other properties of the correction medium layer such as opacity, film integrity, water resistance, and color.

The invention is directed to two layered correction tapes with a transfer layer and a correction medium layer containing at least one bleed inhibitor additive. The bleed inhibitor has a dual effect; it decreases ink bleed and allows for overwriting without smearing.

The invention features correction medium layers that have good bleed resistance when used to cover marks made with inks. As used herein, the term "inks" means an ink which is either water based or solvent based and which is deposited from writing instruments or printing devices.

The invention preferably comprises a correction tape which includes a support member coated with the correction medium layer which is then coated with a transfer layer. The correction medium layer comprises opacifying pigment, polymer binder, and bleed inhibitor.

The support member includes a support layer that can receive the correction medium layer. Suitable support members can be coiled into rolls and used in correction tape dispensers. Suitable correction tape dispensers include those disclosed in U.S. Pat. No. 5,556,469 issued to Koyama et al. hereby incorporated by reference. Preferred support members include paper, plastic films, such as polyester, polycarbonate, polyacrylic, polyolefin, polystyrene, etc., and metal foils such as aluminum, zinc, brass, etc. More preferred support members include controlled release siloxane double coated glassine paper such as Item #17513 (50 lb. white coated two sided moderate release) manufactured by Siltech.

The correction medium layer includes compounds capable of carrying the opacifying pigment and bleed inhibitor onto the support member or support surface, as well as onto the paper or other substrate that contains the erroneous markings to be corrected. A preferred compound is a binding agent such as polymers, other additives such as biocides, fillers, defoamers, dispersants, waxes, and surfactants, can also be included.

As used in the present invention, "biocide" means a chemical agent capable of killing living organisms, i.e., a preservative. The preservative or biocide is used to prevent bacteria or fungi from contaminating the correction medium layer. Bacteria and fungi attack polymers, and are often found dormant in some of the ingredients. A sufficient amount of biocide should be used to prevent bacterial growth. Biocides include TROYSAN 174 biocide, TROYSAN 186 biocide, and TROYSAN 395 biocide, manufactured by Troy, PARADYME biocide manufactured by Zeneca, CANGUARD 442 biocide and CANGUARD 327 biocide manufactured by Angus, mixtures thereof, or any number of compounds known as recognized by those skilled in the art. Preferably, biocide should be in the amount between about 0.001% to about 1% by weight. More preferably, biocide should be in the amount between about 0.05% to about 0.5%.

Fillers incorporated into the correction medium layer are the normally commercially available fillers. Such fillers typically include magnesium carbonate, calcium carbonate, barium carbonate, barium sulfate, aluminum oxide, silicon dioxide, sellaite, clay, talc, or mixtures thereof. The amount of fillers present in the correction medium layer is between about 5% to about 40% by weight. Preferably, the amount of fillers present in the correction medium layer is between about 10% to about 30% by weight.

As used in the present invention, "defoamer" is a compound capable of reducing foam within the correction medium layer during application to the support member. Suitable defoamers include DEE FO 97-3 defoamer made by UltraAdditives, FOAMASTER 111 defoamer manufactured by Henkel, 305 ANTIFOAM defoamer, 62 ADDITIVE defoamer, and 65 ADDITIVE defoamer manufactured by Dow Corning, DAPRO DF 944 defoamer manufactured by ELEMENTIS, COLLOID 643 defoamer manufactured by Rhone-Poulenc, SURFYNOL DF-58 defoamer, manufactured by Air Products, and mixtures thereof. The amount of defoamers present in the correction medium layer is between about 0.01% to about 2% by weight, preferably between about 0.1% to about 0.75% by weight.

As used in the present invention, a "surfactant" is a compound capable of reducing the surface tension of the correction medium layer during coating, such that the coating will apply smoothly and evenly to the support member. Suitable surfactants include FC-120 surfactant manufactured by 3M, BYK 345 surfactant, BYK 346 surfactant, and BYK 348 surfactant manufactured by BYK Chemie, SURFYNOL 104A surfactant, SURFYNOL 104BC surfactant, SURFYNOL 104E surfactant, and SURFYNOL 104H surfactant manufactured by Air Products, TRITON X-102 surfactant, TRITON CF-10 surfactant, and TRITON X-35 surfactant manufactured by Union Carbide, and mixtures thereof. The amount of surfactants present in the correction medium layer is between about 0.1% to about 3% by weight, preferably between about 0.1% to about 1.5% by weight.

Any suitable opacifying pigment having adequate hiding power to cover ink may be utilized as the primary pigment in the correction medium layer. A preferred opacifying primary pigment is titanium dioxide, $TiO_2$, as it provides for maximum hiding and is a white pigment which can be toned to match a variety of bright paper stock colors. More than one type of $TiO_2$ may be used to maximize hiding and optimize the viscosity of the correction coating.

Sufficient opacifying pigment should be included so that a mark on paper is not visible after curing, but not so much that it interferes with the correction medium layer's physical strength (i.e., make the correction medium layer too brittle). Opacifying pigments include at least pigments such as $TiO_2$, however other filler pigments may be used. Preferably, the opacifying pigment should include $TiO_2$ between about 20% to about 80% and more preferably between about 30% to about 70%, of the pigment by weight of the correction medium layer. Suitable $TiO_2$ pigments include commercially available R-700 pigment, R-706 pigment, R-902 pigment, R-931 pigment, R-960 pigment, and R-900 pigment, manufactured by Dupont, TRONOX CR-813 pigment, TRONOX CR-822 pigment, and TRONOX CR-828 pigment manufactured by Kerr-McGee, KRONOS 2020 pigment, KRONOS 2090 pigment, KRONOS 2102 pigment, and KRONOS 2131 pigment manufactured by Kronos, and mixtures thereof. The various grades have different levels of surface treatment to promote dispersability, hiding power, and stability. One of ordinary skill in the art can select the best type of specific pigment for any particular formulation of correction medium layer by conducting routine tests. Suitable filler pigments include commercially available HUBER 90C pigment, and POLYGLOSS 90 pigment made by Huber.

The correction medium layer is typically colored white because articles to be subjected to masking-correction are generally white paper. Where a paper sheet or a like article colored in a color other than white is to be subjected to masking correction, the masking layer is preferably colored in substantially the same color as the background color of the article so that masked portions thereof are neither distinguished from the background nor outstanding.

Typically, $TiO_2$ is used as a white pigment for the opacifying pigment, because it has excellent hiding power. The opacifying pigment color may be adjusted by using a coloring agent or toner together with the white pigment. Examples of specific coloring agents or toners include aluminum powder, copper powder, brass powder, and dyes.

Examples of color pigments other than white pigment include inorganic pigments such as Titanium Yellow, iron oxide pigments, Ultramarine Blue, Cobalt Blue, Chromium Oxide Green, Spinel Green, Chrome Yellow, Chrome Vermilion, Cadmium Yellow, Cadmium Red, and organic pigments such as azo lake pigments, Hanza pigments, benzimidazolone pigments, monoazo pigments, diarylide pigments, pyrazolone pigments, condensed azo pigments, phthalocyanine pigments, quinacridone pigments, perylene pigments, perinone pigments, dioxazine pigments, antrhaquinone pigments, and isoindolinone pigments.

Binding polymers include any polymer capable of holding the opacifying pigment within the polymer matrix of the correction medium layer. Preferred binding polymers include ROVENE 4170 polymer, ROVENE 4176 polymer, and ROVENE 4041 polymer manufactured by Mallard Creek, UCAR LATEX 480 polymer, UCAR LATEX 651 polymer, UCAR LATEX 169 polymer, UCAR LATEX 379 polymer, UCAR 149 polymer, and UCAR 441 polymer manufactured by Union Carbide, AIR FLEX 465 polymer, AIR FLEX 401 polymer, AIR FLEX 124 polymer, and AIR FLEX 114 polymer manufactured by Air Products, GCRYL 1256 polymer, GCRYL 1238 polymer, GCRYL 1224 polymer, and ACX 12-924 polymer manufactured by Henkel, and NEOCRYL A-5044 polymer, NEOCRYL BT62 polymer, NEOCRYL XA 2022 polymer, and NEOCRYL A-5047 polymer, manufactured by Zeneca. More preferred binding polymers include acrylic and methacrylic multipolymers having a Tg range of between about −60° C. to about 20° C., preferably between about −50° C. to about 5° C. Polymers may be blended as is well known in the art.

The amount of binding polymer present in the correction medium layer is between about 1% to about 35% by weight. Preferably, the amount is between about 5% to about 25% by weight.

The term "bleed inhibitor" means a chemical additive which, when present, prevents ink from migrating into a correction medium layer after the correction medium is applied to erroneous markings. Suitable bleed inhibitors include polyvinyl amine or salts thereof, phosphatidyl choline (mixtures of diglycerides of fatty acids linked to the choline ester of phosphoric acid), tallow amines, and mixtures thereof.

Preferred bleed inhibitors include polyvinyl amine which includes vinylamine homopolymers of molecular formula $(C_2H_5N)_x$, where x represents an integer from 5 to 150. Preferably, the polyvinyl amine is a homopolymer of vinyl amine having a weight average molecular weight of between about 1000 to about 100,000. More preferred polyvinyl amines include POLYVINYL AMINE (CAS 02336-38-9) made by Polysciences Inc. Another bleed inhibitor includes the complex combination of diglycerides of fatty acids linked to the choline ester of phosphoric acid. Preferred complex combination of diglycerides of fatty acids linked to the choline ester of phosphoric acid is lecithin. Another useful bleed inhibitor are tallow amines. Preferred tallow amines include N-tallow amines such as N-tallow alkyltrimethylenediamine oleates.

Preferably, two or more bleed inhibitors can be used together in the correction medium layer. A preferred combination of two bleed inhibitors includes the polyvinyl amine in an amount of 20% to 80% by weight of the total amount of bleed inhibitor and phospholipid in an amount of 80% to 20% by weight. In this combination, it is often desirable to include a greater amount (i.e., more than 50% by weight) of the polyvinyl amine. More preferably, all three bleed inhibitors can be used in the correction medium layer. In this combination, the polyvinyl amine may be present in an amount of between about 30% to about 80% by weight, the phospholipid in an amount of between about 10% to about 35% by weight, and the tallow amine in an amount of between about 10% to about 35% by weight, wherein all three components total 100% of the bleed inhibitor. Bleed inhibitors which include one or more of these bleed inhibitor components include COLOROL STANDARD bleed inhibitor, COLOROL F bleed inhibitor and COLOROL 100 bleed inhibitor, as manufactured by Lucas Meyer. Mixtures of these additives can also be used if desired.

Whether composed of one, two or more components, the bleed inhibitor is present in the correction medium in an amount between about 0.1% to about 10% by weight, preferably between about 0.5% to about 5% by weight and more preferably between about 1% to about 4% by weight.

A typical process for the preparation of a correction tape comprises applying a uniform coating of a correction medium layer onto a support member in conventional manner. The correction medium layer may be applied using a standard coating machine which applies a uniform amount of liquid and dries the wet film. The dry film thickness is between about 5 microns to about 45 microns. Preferably, the dry film thickness is between about 15 microns to about 28 microns.

The pressure sensitive adhesive of the transfer layer may also be applied to on top of the correction medium layer in the same manner as the coating was applied. Suitable pressure sensitive adhesives include NACOR 4554 adhesive, NACOR 8685 adhesive, and NACOR 9926 adhesive manufactured by National Starch and Chemical Company, FULATEX PN-3181-K adhesive, and FULATEX PN-3819-G adhesive manufactured by H. B. Fuller, ACRONAL v 275 adhesive, ACRONAL A 220 adhesive, and ACRONAL 3432 adhesive manufactured by BASF, COVINAX 210-00 adhesive, COVINAX 225-00 adhesive, and COVINAX 222-00 adhesive manufactured by Franklin International, and mixtures thereof. The minimum amount of adhesive applied is that which enables the correction medium layer to adhere to the substrate. One of ordinary skill in the art can easily determine the amounts to use by routine testing.

EXAMPLES

Certain embodiments and features of the invention are now illustrated, but not limited, by the following working examples.

Example 1

This example illustrates a general method for formulating the correction medium of the invention. Water, an alkanol amine (for pH adjustment), and a defoamer are added in a vessel and mixed under low shear via a high speed disperser or rotor stator disperser. After mixing for approximately five minutes, lecithin is added and mixed for 45 minutes under high shear. The resin and wax emulsion are added and mixed under low shear, subsequently, pigments and fillers are mixed in under high shear. Other additives included in the correction medium layer or transfer layer are biocide, toners, and surfactants. Upon completion of mixing, the correction medium should be held for 24 hours. The composition is then coated onto a support member via a coating machine which applies a uniform amount of liquid and dries the wet film to a thickness of 14–28 microns. A pressure sensitive adhesive layer is then applied by the same method on top of the correction medium layer to form the correction tape of the invention.

Example 2

Water 28–32% by weight, AMP-95 2-amino-2-methyl-1-propanol, by ANGUS CHEMICAL Co. 0.1 to 2% by weight, and a foam suppressing dispersion defoamer, DEE FO 97-3 defoamer, by Ultra Additives, 0.1 to 2% by weight are added in a vessel and mixed under low shear via a high speed disperser or rotor stator disperser. After mixing for approximately five minutes, polyvinyl amine PVA made by Polysciences 0.5 to 1.5% by weight, is added as a bleed inhibitor and mixed for 45 minutes under high shear. A resin emulsion ACRONOL V-210 emulsion by BASF at 5–8% and a wax emulsion, SLYP-AYD SL 340 E emulsion made by ELEMENTIS at 6–8% by weight, are added and mixed under low shear. Subsequently, pigments, rutile $TiO_2$ 30–50% by weight, and fillers, totaling 13–20% by weight, are mixed in under high shear. Other additives included in the correction medium are biocide, KATHON PFM biocide by ROHM & HAAS 0.1 to 5% by weight, toners, TINTAYD WD 2115 Violet toner and TINTAYD WD 2228 toner 0.015% total of 2% by weight, and surface tension modifiers, SURFACTANT FC-120 by 3M at 0.5 to 1.5% by weight. Upon completion of mixing, the correction medium should is held for 24 hours. The composition then is coated onto a support member via coating machine which applies a uniform amount of liquid and dries the wet film to a thickness of about 14 to 28 microns. Subsequently, a layer of pressure sensitive adhesive is applied on the correction medium layer to form the correction tape of the invention.

Example 3

Water 28–32% by weight, AMP-95 2-amino-2-methyl-1-propanol, by ANGUS CHEMICAL Co. 0.1 to 2% by weight, and a foam suppressing dispersion defoamer, DEE FO 97 defoamer by ULTRA ADDITIVES 0.1 to 2% by weight are added in a vessel and mixed under low shear via a high speed disperser or rotor stator disperser. After mixing for approximately five minutes, COLOROL STANDARD by Lucas Meyer, 0.5% to 1.5% by weight, is added and mixed for 45 minutes under high shear, as a bleed inhibitor. COLOROL STANDARD is a proprietary mixture of polyvinyl amine, lecithin, and N-tallow amine. The resin emulsion ACRONOL V-210 emulsion by BASF at 5–8% and the wax emulsion, SLIP-AYD SL 340-E emulsion by ELEMENTIS at 6–8% by weight, are added and mixed under low shear. Subsequently, pigments, rutile $TiO_2$ 30–50% by weight, and fillers, totaling 13–20% by weight, are mixed in under high shear. Other additives included in the correction medium are biocide, KATHON PFM biocide by ROHM & HAAS 0.1 to 0.5% by weight, toners, TINTAYD WD 2115 VIOLET toner and TINTAYD WD 2228 toner by ELEMENTIS 0.015% by weight, and surface tension modifiers, surfactant FC-120 by 3M at 0.5 to 1.5% by weight. Upon completion of mixing, the correction medium is held for 24 hours. The composition is coated onto a support member via coating machine which applies a uniform amount of liquid and dries the wet film to a thickness of 14–28 microns. Subsequently, a layer of pressure sensitive adhesive is applied on the correction medium layer to form the correction tape of the invention.

Example 4

The correction tape of Example 3 and a conventional tape without bleed inhibitor were applied onto various erroneous markings on white bond paper and their masking ability was compared. Results are as follows:

| Sample | Erroneous marking made by: | | |
| --- | --- | --- | --- |
| | BIC Round Stick Red Medium Ball Pen | Rose Art Red Medium Ball Point Stick Pen | Cross Red 8515 Medium Ball Point Pen |
| Tape of Example 3 | None | Slight | Slight |
| Tape of Example 3 without Bleed Inhibitor | Slight | Moderate | Moderate |

Test Procedure

The three test inks listed above were applied in a straight line onto Hammermill Tidal DP Long Grain 75g/m$^2$ white paper. The inks were allowed to dry for 30 minutes, after which the correction tape was applied over the ink marking. After this initial application, the underlying ink marking was completely hidden by the correction tape. Subsequently, the correction tapes applied over the ink markings were kept in a 24° C., 48% relative humidity environment for 48 hours. The display containing the correction tapes placed over the ink markings was then visually observed for any signs of ink bleeding. Ink bleed is graded by the level of ink color visually detected on the white correction tape. The degree of ink bleed were judged on a scale from None to Slight to Moderate to Severe.

The results of Example 4 clearly demonstrate the reduced bleed through obtained with tapes embodying the present invention. As shown in Example 4, the amount of bleed through in the tape embodying the present invention, i.e., the tape of Example 3, is substantially less than bleed through in a conventional correction tape which does not contain bleed inhibitors.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed:

1. A correction tape comprising:
   a support member;
   a correction medium layer which includes:
      an opacifying pigment in an amount sufficient to mask printed or ink matter on a substrate;

a bleed inhibitor in an amount sufficient to prevent or reduce ink transmission through the correction medium layer; and a polymeric binder for retaining the opacifying pigment and bleed inhibitor in the correction medium layer to facilitate deposition of the layer onto the support member and to retain integrity when the layer is transferred to the substrate to mask the printed or ink matter thereon; and a transfer layer which includes a pressure sensitive adhesive for adhering the correction medium layer to the printed or ink matter and substrate.

2. The correction tape of claim 1 wherein the support member is selected from the group consisting of paper, thermoplastic film, and metallic foil.

3. The correction tape of claim 1 wherein the support member is a coated glassine paper to facilitate removal of the correction medium layer.

4. The correction tape of claim 1 wherein the bleed inhibitor comprises at least one polyvinyl amine, phospholipid, tallow amine, or a mixture thereof.

5. The correction tape of claim 4 wherein the bleed inhibitor includes both the polyvinyl amine and the phospholipid.

6. The correction tape of claim 5 wherein the polyvinyl amine is present between about 20% to about 80% by weight, and the phospholipid between about 80% to 20% by weight.

7. The correction tape of claim 5 wherein the polyvinyl amine is present in an amount which is greater than that of the phospholipid.

8. The correction tape of claim 4 wherein the bleed inhibitor includes the polyvinyl amine, the phospholipid, and the tallow amine.

9. The correction tape of claim 8 wherein the polyvinyl amine is present in an amount between about 30% to about 80% by weight, the phospholipid is present in an amount between about 10% to about 35% by weight, and the tallow amine is present in amounts between 10% and about 35% by weight.

10. The correction tape of claim 8 wherein the phospholipid is a complex combination of a diglyceride of a fatty acid linked to the choline ester of phosphoric acid.

11. The correction tape of claim 8 wherein the phospholipid is lecithin, the tallow amine is N-tallow amine, and the polyvinyl amine is a homopolymer of vinyl amine having a weight average molecular weight of between about 1000 to about 100,000.

12. The correction tape of claim 1 wherein the bleed inhibitor is present in the correction medium layer in an amount between about 0.01% to about 10% by weight.

13. The correction tape of claim 1 wherein the bleed inhibitor is present in the correction medium layer in amounts between about 0.5% to about 5% by weight.

14. The correction tape of claim 8 wherein the total amount of the three bleed inhibitor components is between about 0.01% to about 10% by weight.

15. The correction tape of claim 8 wherein the total amount of the three components of the bleed inhibitor is between about 0.5% to about 5% by weight.

16. The correction tape of claim 1 wherein the opacifying pigment comprises $TiO_2$.

17. The correction tape of claim 1 wherein the correction medium layer further comprises at least one additive selected from the group consisting of a filler, biocide, defoamer, wax emulsion, and surfactant.

18. The correction tape of claim 1 further comprising at least one toner in an amount sufficient to impart a color to the correction medium layer.

* * * * *